United States Patent [19]

Ramos, Jr.

[11] Patent Number: 4,786,261
[45] Date of Patent: Nov. 22, 1988

[54] ELECTRICAL CONNECTOR ASSEMBLY FOR A TRUCK-TRAILER JUMPER CABLE

[76] Inventor: Phillip M. Ramos, Jr., 16715 Amberwood Way, Cerritos, Calif. 90701

[21] Appl. No.: 5,147

[22] Filed: Jan. 20, 1987

[51] Int. Cl.⁴ .............................................. H01R 19/28
[52] U.S. Cl. ....................................... 439/686; 439/469
[58] Field of Search .......................... 439/34, 142–144, 439/503, 598, 599, 686, 687, 690, 691, 695, 469

[56] References Cited

U.S. PATENT DOCUMENTS

| | | | |
|---|---|---|---|
| 2,188,530 | 1/1940 | Del Camp | 439/851 |
| 2,236,385 | 3/1941 | Schneider | 439/695 |
| 2,559,174 | 7/1951 | Skony | 439/854 |
| 3,187,292 | 6/1965 | Small et al. | 439/275 |
| 3,402,382 | 9/1968 | De Tar | 439/598 |
| 3,887,256 | 6/1975 | Klimek et al. | 439/142 |
| 3,904,265 | 9/1975 | Hollyday et al. | 439/687 |
| 4,304,457 | 12/1981 | Lissan | 439/682 |
| 4,361,376 | 11/1982 | Gallusser et al. | 439/598 |
| 4,443,048 | 4/1984 | Moist, Jr. | 439/599 |
| 4,611,880 | 9/1986 | Petersen et al. | 439/599 |

FOREIGN PATENT DOCUMENTS

481496 12/1969 Switzerland ...................... 439/695

Primary Examiner—Gil Weidenfeld
Assistant Examiner—Gary F. Paumen
Attorney, Agent, or Firm—Keith D. Beecher

[57] ABSTRACT

A light weight heavy duty electrical connector for a truck-trailer jumper cable which is constructed of a virtually indestructible plastic material resistant to corrosive chemical attack. The connector assembly includes an inner plastic body having a plurality of axially extending channels angularly spaced around the periphery thereof for receiving the individual conductors of the jumper cable and for mounting a corresponding plurality of resilient elongated split tubular electric contacts, each having a D-shaped cross-section and which are crimped to the respective conductors of the jumper cable. A removable plastic cap fits over the inner body to protect the contacts and to prevent short circuiting between the contacts. The inner body is received in an outer tubular plastic body having an integral funnel-shaped chamfer cable guard at the rear end thereof, with the jumper cable extending through the cable guard into the outer body. A transverse radially movable plastic clamp is mounted in the outer body adjacent to the rear end thereof for engaging the cable, and a set screw is threaded into the outer body to force the clamp against the cable without damage to the cable, thereby enabling the cable to hold the inner body and cap against axial movement with respect to the outer body.

8 Claims, 3 Drawing Sheets

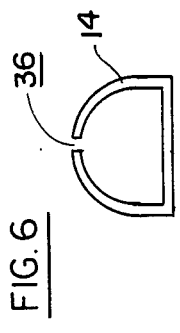
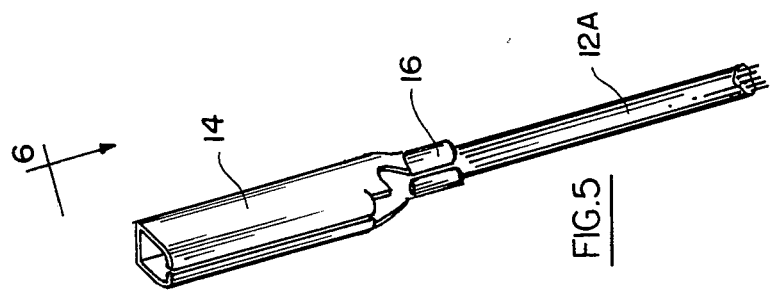
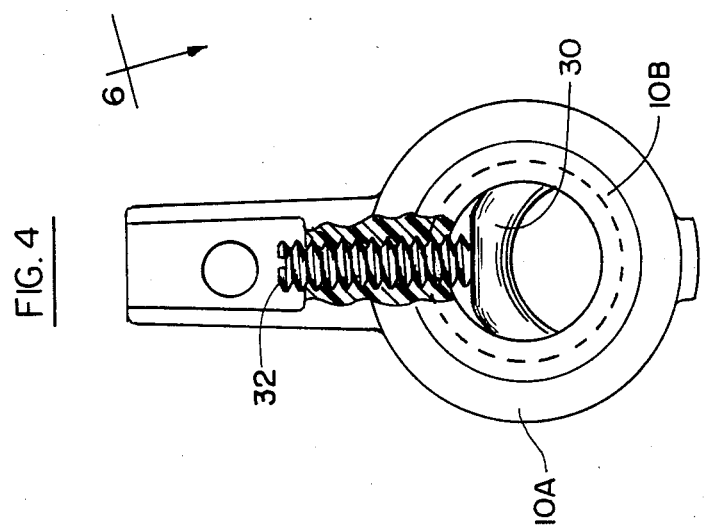
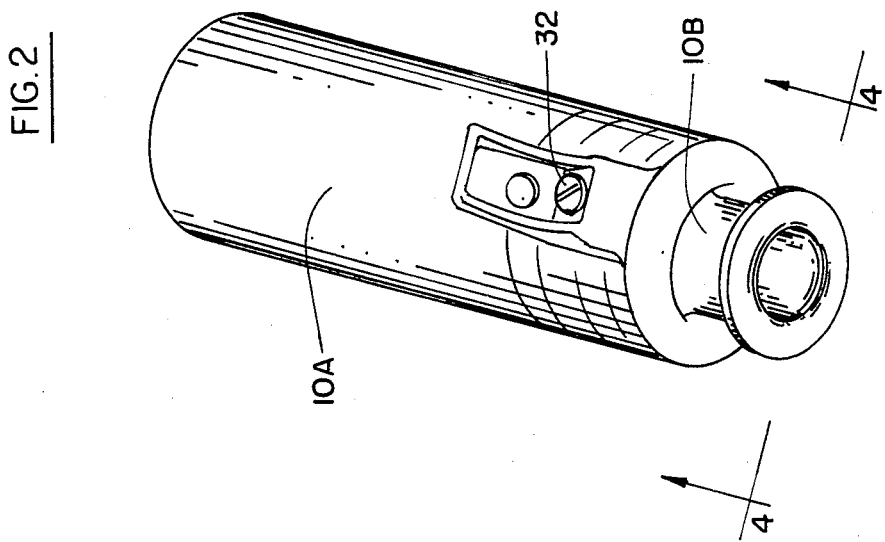

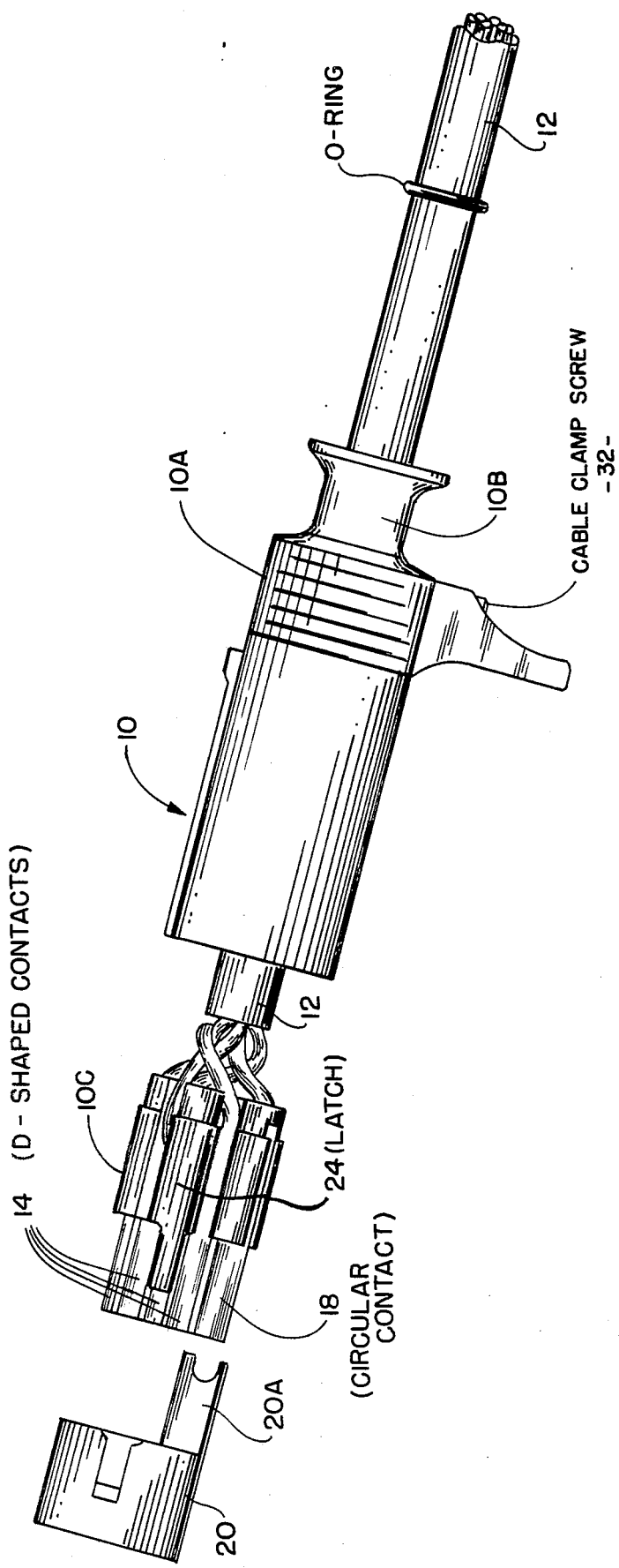

ELECTRICAL CONNECTOR ASSEMBLY FOR A TRUCK-TRAILER JUMPER CABLE

BACKGROUND OF THE INVENTION

Seven-conductor electrical connectors for truck-trailer jumper cables have become a standard item in the trucking industry. These connectors are subject to SAE standards, such as SAE Standard J560b. The jumper cables themselves are also subject to SAE standards, such as SAE Standard J1067.

Originally, the housings of the connectors were constructed of an appropriate metal. However, since metal is subject to corrosion, there has been a trend in recent years to make the connector housings out of plastic. Problems have arisen, however, in constructing the plastic housings to be sufficiently strong and sturdy so as to withstand the normal rough wear and tear to which they are placed during day-to-day operations. Also, problems have arisen in constructing the plastic housings to be weather durable and to be unaffected by extreme ranges in ambient temperatures. Also, the prior art plastic housings have proven to be susceptible to corrosive chemical attack, especially from corrosive chemical sprays used to clean the internal contacts of the connector.

Accordingly, an objective of the present invention is to provide an improved electrical connector of the type under discussion whose housing is constructed of a virtually indestructible plastic material, which is resistant to corrosive chemical attack, and which is unaffected by extremes in ambient temperatures.

Another object of the invention is to provide such an improved electrical connector whose internal contacts have a particular cross-section shape which greatly improves the longevity for providing a firm and positive contact with the pins of the receptacle with which the connector is used. Contact lost after numerous couplings is a common problem with prior art contacts.

Yet another objective of the invention is to provide such an improved connector whose internal contacts are electrically connected to the conductors of the jumper cable by a simple crimping operation, and which are not subject to loosening due to truck vibration.

A still further objective of the invention is to provide such an improved electrical connector which is clamped to the cable in a firm and positive manner that does not have any tendency to damage the cable or create short circuits between its conductors.

Other objectives and features of the improved connector of the present invention will become apparent as the description proceeds.

BRIEF DESCRIPTION OF THE DRAWINGS

FIG. 2 is a perspective representation of the connector assembly of FIG. 1;

FIG. 3 is an exploded view of the connector assembly;

FIG. 4 is a rear view of the connector assembly showing a transverse clamping member which is mounted adjacent to the rear end of the outer body of the assembly;

FIG. 5 is a perspective view of one of the internal split tubular resilient contacts of the connector assembly and showing the manner in which the contact is crimped to one of the conductors of the cable; and FIG. 6 is a view, taken along the line 6—6 of FIG. 5, and showing the cross-section of the contact.

DETAILED DESCRIPTION OF THE ILLUSTRATED EMBODIMENT

Figure 1:
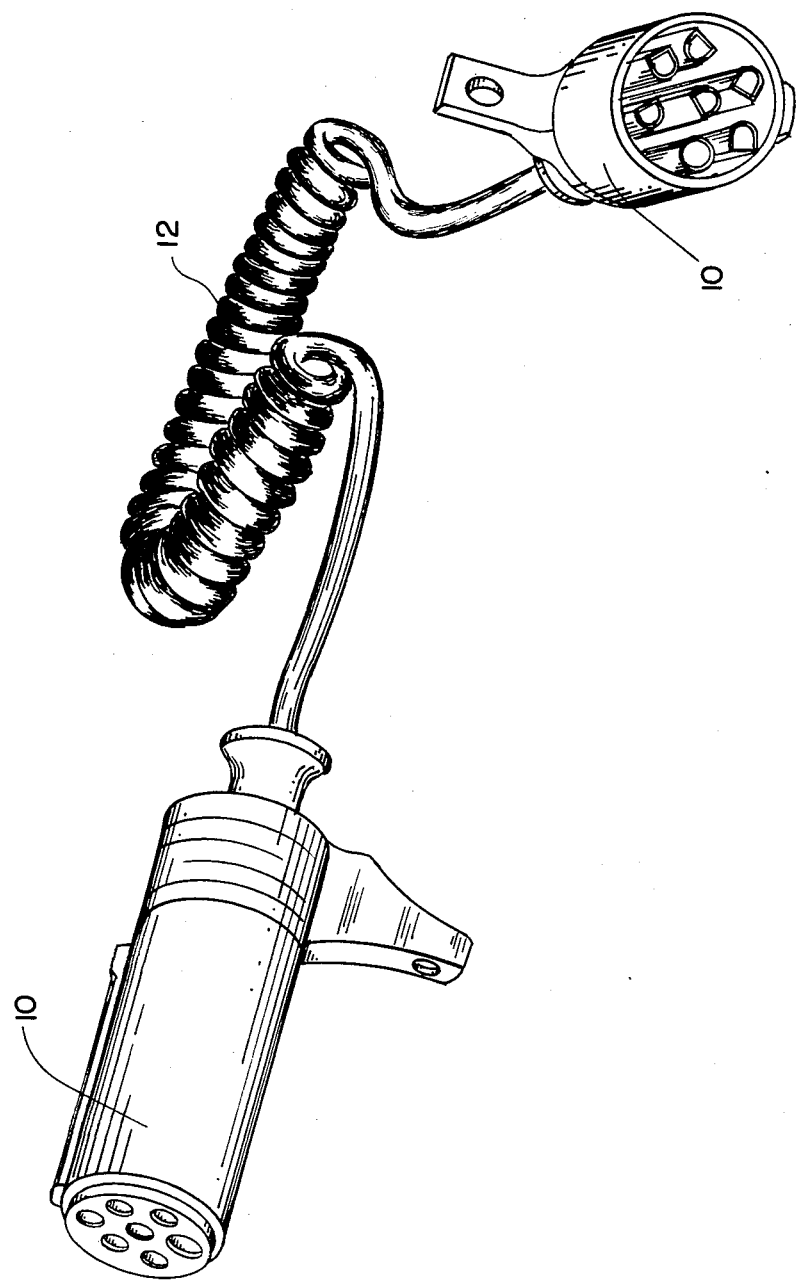
FIG. 1 is a perspective representation showing two connectors constructed in accordance with the present invention connected to the ends of a multi-conductor cable.

As shown in FIG. 1, electrical connectors 10 are connected to each end of, for example, a seven-conductor truck-trailer jumper cable 12. One of the connectors 10 is adapted to be plugged into the usual electrical receptacle mounted on the rear end of the truck, and the other connector is adapted to be plugged into the electrical receptacle mounted on the forward end of the trailer. The connectors 10 are constructed in accordance with the teachings of the invention, as will become apparent as the description proceeds.

As best shown in FIG. 3, the connector assembly 10 includes an outer plastic body 10A having an integral plastic funnel-shaped chamfer cable guard 10B mounted at its rear end for receiving cable 12, and for protecting the cable from chafing. Cable 12 extends through the cable guard 10B into the interior of the outer body 10A, and the electrical conductors 12A of the cable 12 extend into axial channels formed about the periphery of a plastic inner body 10C at angularly spaced positions about the inner body and extending from one end of the inner body to the other.

A plurality of split tubular, resilient contacts 14 are mounted in the respective channels of the inner body and are each crimped, by means of a B-shaped crimp 16, such as shown in FIG. 5, the individual conductors 12A of the cable 12. The contacts 14 each has a D-shaped cross-section, for reasons to be described. One of the conductors 12A of the cable 12 is a ground conductor, and it is connected to a slitted tubular resilient contact 18. Contact 18 has a somewhat larger diameter than contacts 14, and it has a circular cross-section. The contacts 14 and 18 extend beyond the forward end of inner body 10C, as shown in FIG. 3.

A plastic cap 20 is provided having, a tubular portion 20A extending from its inner end for receiving the forward portion of contact 18 which extends beyond the forward end of inner body 10C. Cap 20 has a plurality of passages extending axially therethrough for receiving the forward portions of contacts 14 and 18 which extend beyond the forward end of inner body 10C. The cap 20 serves to separate the contacts 14 and 18 from one another, and to prevent short circuiting between the contacts. Cap 20 is latched onto the inner body 14 by a pair of latches, such as latch 24, and is held on the inner body in abutting coaxial relationship therewith.

The outer body 10A and integral chamfer guard 10B, as well as the inner body 10C and cap 20, are all formed of a selected plastic material which is virtually indestructible, and which is not subject to corrosion, especially due to salt and snow and chemical sprays, and which is immune to wide ranges in ambient temperatures. Such a material is presently manufactured and sold by the General Electric Company under the trademark "Xenoy", and comprises a modified polycarbonate. This material has a distinct advantage over a previous General Electric polycarbonate plastic sold under the trademark "Lexan" which does not possess chemical resistant properties.

The integral funnel-shaped chamfer cable guard 10B insures cable protection, and it is not subject to breakage or other limitations of the usual spring-type prior art cable guards. The inner body 10C allows free floating movement of the contacts 14 and 18 to insure self-alignment with each pin of the receptacle. The cap 20 is removable to permit replacement of the contacts.

As shown in FIG. 4, a clamping member 30 is mounted in the outer body adjacent to the rear end thereof. The clamping member has an elongated strip-like configuration, and it is slidable radially within the outer body against the cable 12. The clamping member is engaged by a set screw 32 which is adjusted to force the clamping member against the cable. The assembly is such that the cable may be positively clamped within the outer body, and since the clamping member is made of plastic there is no tendency to damage the cable and also to cause short circuits between the individual conductors within the cable, which often occurs in the prior art assemblies in which metallic clamps or the set screw 32 directly engages the cable.

The outer body 10A and chamfer guard 10B are clearly shown in the perspective view of FIG. 2, as is the position of the set screw 32.

The direct crimping between each contact 14 and its corresponding cable conductor 12 allows the contacts to be directly crimped right onto the conductor; as opposed to the usual prior art practice of using screws to connect the contacts to the cable conductors. Such screws are subject to corrosion, and they also have a tendency to loosen due to truck vibration. The direct crimping of the contacts to the cable conductors in the connector assembly of the invention insures both improved continuity and wire security.

As shown in FIG. 6, the elongated split tubular resilient contacts 14 each has a D-shaped cross-sectional configuration. These are spring-loaded contacts, and they are constructed to permit countless pluggings and unpluggings without loss in electrical connection with the pins of the corresponding receptacle. The contacts 14 are preferably made of a spring brass, as is contact 18. The round curved portion of the "D" of each contact 14 is slit in the center by a longitudinally-extending slit 36, so that when a pin of the corresponding receptacle is received into or removed from the contact, the contact opens and closes in a manner similar to the action of a drawbridge. The contacts 14 are self-cleaning during the insertion and extraction action.

The "D" configuration of each contact 14 allows self-centering of the receiving pins. This concept is understood upon studying the configuration of an equilateral triangle. Lay the "D" to the left to rest on its flat side. Now consider the three tapers from the three corners of the triangle for guiding a circular pin to its center. Now note that the "D" is somewhat triangular. Prior art circular contacts are not self-centering and are often damaged by misaligned pins.

Each D-shaped contact 14 has two pivoting points (top and bottom corners), as opposed to the usual prior art circular contacts which have none. When the inner diameter of the prior art circular contact is even slightly enlarged, the whole circumference of the contact is enlarged, resulting in electrical contact loss. With the D-shaped contacts of the present invention, even if enlargement occurs, the two pivoting points always insure contact. The contacts of the invention have been tested for over one million insertions and extractions without loss of electrical contact.

The invention provides, therefore, an electrical connector assembly which is constructed to take extreme mechanical and thermal abuses, and which is corrosion-proof and resistant to most chemicals. The plastic material forming the inner and outer bodies and the cap of the assembly is spark-proof, allowing for safer conditions around inflammable materials. A constructed embodiment of the connector of the invention has been found to be unaffected by temperature ranges extending from $-70°$ F. to $+300°$ F. The electrical connector assembly of the invention fits into conventional receptacles, and it meets or exceeds all SAE and other specifications and requirements.

It will be appreciated that while a particular embodiment of the invention has been shown and described, modifications may be made. It is intended in the claims to cover all modifications which come within the true spirit and scope of the invention.

I claim:

1. An electrical connector for a multiconductor jumper cable comprising: an inner body having a plurality of axially extending channels angularly spaced around the periphery thereof; a plurality of elongated split tubular resilient contacts respectively positioned in said channels having forward portions extending beyond the forward end of said inner body and respectively connected to individual conductors of said cable; a cap having a plurality of axial passages extending therethrough for receiving the forward portions of respective ones of said contacts to separate and insulate said contacts from one another; latch means mounted on said inner body and releasably engaging said cap for removably mounting said cap on said forward end of said inner body in abutting coaxial relationship with the forward end of said inner body; a tubular shaped outer body having an open forward end for receiving said inner body and said cap in coaxial relationship therewith and having an open rear end for receiving the cable; and clamping means mounted adjacent to the open rear end of said outer body for engaging the cable so as to prevent axial movement of said inner body and said cap with respect to said outer body.

2. The electrical connector defined in claim 1, in which said inner body, said outer body, said cap and said clamping means are all formed of a virtually indestructible modified polycarbonate plastic material designated "XENOY" which is resistant to chemical attack.

3. The electrical connector defined in claim 1, in which said elongated split tubular contacts have a D-shaped cross-section.

4. The electrical connector defined in claim 1, and which includes a plurality of B-shaped crimping members; and in which said elongated split tubular resilient contacts are crimped by said B-shaped crimping members to corresponding ones of said cable conductors.

5. The electrical connector defined in claim 1, and which includes a funnel-shaped chamfer cable guard formed integral with the rear end of said outer body through which the cable extends.

6. The electrical connector defined in claim 1, in which said clamping means includes a transverse clamping member slidably mounted in said outer body adjacent to said rear end and extending transversely thereacross and radially movable against the cable; and means extending through the wall of said outer body and engaging said clamping member for forcing said clamping member into clamping engagement with the cable.

7. The electrical connector defined in claim 6, in which said means engaging said clamping member comprises a set screw threaded into the wall of said outer body.

8. The electrical connector defined in claim 1, and which includes an O-ring mounted at the rear end of said outer body and engaging the cable to prevent moisture from entering said outer body.

* * * * *